(12) United States Patent
Nelson et al.

(10) Patent No.: US 6,761,046 B2
(45) Date of Patent: Jul. 13, 2004

(54) COLD ROLLING OF GLASS PREFORMS

(76) Inventors: Jayson J. Nelson, Eastman Kodak Company, 343 State St., Rochester, NY (US) 14650; Eugene G. Hill, Eastman Kodak Company, 343 State St., Rochester, NY (US) 14650; Michael K. Budinski, Eastman Kodak Company, 343 State St., Rochester, NY (US) 14650; James M. Warner, Eastman Kodak Company, 343 State St., Rochester, NY (US) 14650

( * ) Notice: Subject to any disclaimer, the term of this patent is extended or adjusted under 35 U.S.C. 154(b) by 346 days.

(21) Appl. No.: 09/882,599

(22) Filed: Jun. 15, 2001

(65) Prior Publication Data

US 2003/0000253 A1 Jan. 2, 2003

(51) Int. Cl.[7] .............................................. C03B 13/14
(52) U.S. Cl. ...................... 65/102; 65/182.2; 65/228; 65/370.1
(58) Field of Search ................................ 65/182.2, 228, 65/102, 302–304, 370.1

(56) References Cited

U.S. PATENT DOCUMENTS

| | | | | |
|---|---|---|---|---|
| 1,148,215 A | * | 7/1915 | Chamberlin | 65/66 |
| 1,148,216 A | * | 7/1915 | Chamberlin | 65/228 |
| 1,410,803 A | * | 3/1922 | Gray et al. | 65/66 |
| 1,752,481 A | * | 4/1930 | Garwood | 65/82 |
| 3,340,034 A | * | 9/1967 | Anderson | 65/109 |
| 3,833,347 A | | 9/1974 | Angle et al. | |
| 4,139,677 A | | 2/1979 | Blair et al. | |
| 4,168,961 A | | 9/1979 | Blair | |
| 4,883,528 A | | 11/1989 | Carpenter et al. | |
| 4,897,101 A | | 1/1990 | Carpenter et al. | |
| 5,709,723 A | | 1/1998 | Gearing | |
| 5,873,921 A | * | 2/1999 | Hirota et al. | 65/25.1 |
| 5,895,512 A | * | 4/1999 | Dominitz et al. | 65/59.6 |
| 6,060,011 A | * | 5/2000 | Zandvliet et al. | 264/275 |

FOREIGN PATENT DOCUMENTS

WO 99/33754 A1 * 7/1999

* cited by examiner

*Primary Examiner*—Sean Vincent
(74) *Attorney, Agent, or Firm*—Mark G. Bocchetti

(57) ABSTRACT

A method and apparatus for making cylindrical glass preforms with convex, optical quality convex end surfaces is taught. A glass ball preform is placed on a heated lower platen. The temperature of the glass ball preform is raised to a temperature above the glass transition temperature of the glass ball preform. The glass ball preform is engaged with an upper platen. At least one of the upper platen and the lower platen is moved vertically to cause the gap between the upper platen and the lower platen to narrow to a predetermined dimension. Simultaneously, at least one of the upper platen and the lower platen is moved horizontally relative to the other platen to cause the glass ball preform to roll between the upper platen and the lower platen and form a cylindrical preform having a predetermined diameter, the cylindrical preform having convex, optical quality end surfaces.

18 Claims, 7 Drawing Sheets

COLD ROLLING OF GLASS PREFORMS

FIELD OF THE INVENTION

This invention relates generally to the fabrication of glass preforms to be used in the molding of glass optics, and more particularly, to methods and apparatus for making cylindrical glass preforms having optical quality convex ends from glass ball preforms.

BACKGROUND OF THE INVENTION

Various methods and apparatus for the compression molding of glass optical elements are known in the prior art. With these methods and apparatus, optical element preforms sometimes referred to as gobs are compression molded at high temperatures to form glass lens elements. The basic process and apparatus for molding glass elements is taught in a series of patents assigned to Eastman Kodak Company. Such patents are U.S. Pat. No. 3,833,347 to Engle et al., U.S. Pat. No. 4,139,677 to Blair et al., and U.S. Pat. No. 4,168,961 to Blair. These patents disclose a variety of suitable materials for construction of mold inserts used to form the optical surfaces in the molded optical glass elements. Those suitable materials for the construction of the molds include glasslike or vitreous carbon, silicon carbide, silicon nitride, and a mixture of silicon carbide and carbon. In the practice of the process described in such patents, a glass preform or gob is inserted into a mold cavity with the mold being formed out of one of the above mentioned materials. The molds reside within a chamber in which is maintained a non-oxidizing atmosphere during the molding process. The preform is then heat softened by increasing the temperature of the mold to thereby bring the preform up to a viscosity ranging from $10^7$–$10^9$ poise for the particular type of glass from which the preform has been made. Pressure is then applied to force the preform to conform to the shape of the mold cavity. The mold and preform are then allowed to cool below the glass transition temperature of the glass. The pressure on the mold is then relieved and the temperature is lowered further so that the finished molded lens can be removed from the mold.

Because the molding of glass optical elements is done by compression rather than injection (as is utilized in plastic molding) a precursor metered amount of glass, generally referred to as a preform, is required. There are two fundamental shapes of preforms required which generally parallel the fundamental finished lens shapes. For negative lenses (negative refers to a concave optical surface) plano-plano preforms usually will be sufficient. These can be fabricated in high volume relatively inexpensively by grinding and polishing. For positive lenses (positive refers to a convex optical surface) a ball (sphere) or ball-like lump of glass is needed.

Traditionally in molding glass lenses, the outside diameter of a glass-molded lens is not constrained. A glass preform is placed on the lower mold. The mold is heated until the glass is soft, and the two molds are pressed together. Any excess glass material is allowed to freely flow beyond the desired diameter of the lens. The mold is then cooled and the molds are separated to produce a finished molded lens. The variation in the outside diameter from lens to lens is proportional to the variation in the volume of the preforms that are used to mold the lenses. To produce finished molded lenses with very tight tolerances on the outside diameter requires very tight control of the preform volume.

When molding precision glass lenses, preforms are often used which approximate the size and shape of the finished product. Since precision lens molding is typically performed while the glass is yet somewhat rigid, any imperfections found on the preforms become magnified during molding as the surface area of the glass is increased. These preforms can become quite expensive to manufacture since the surfaces that are eventually used for imaging must be polished to optical quality in order to produce superior finished products. In the case of positive lens surfaces, which are characterized by a convex lens surface and a concave mold surface, hemispherical ended preforms are often used to approximate the shape of the convex spheric or aspheric lens surface and to reduce the amount of glass flow during the molding cycle. Glass flow is intentionally minimized in order to reduce cycle time, reduce internal and surface stress in the material, and limit the creation of cosmetic surface flaws in the final part.

In a production level glass lens molding process, it is advantageous to use preforms that are symmetric in shape, since part orientation will then be eliminated from the handling process when loading the mold assembly. If notable differences are found between the optic forming surfaces of the preform, the preform is considered to possess a low degree of symmetry and the final lens may not be producible within acceptable tolerance specifications. Therefore, in many cases, the production of high quality preform surfaces is the primary contributor to final lens cost.

There are many applications where it is desirable to mold a glass optical lens such that the outside diameter of the lens is concentric with the optical axis of the lens. The deviation of the distance from the outer radial surface of a lens to the optical axis of the lens is called runout. If the lens is later assembled in a barrel, it is desirable to have the runout minimized such that the optical axis of the lens is colinear with the axis of the barrel. Traditionally, lenses used for imaging purposes (cameras, telescopes, etc.) were designed such that their diameter was much greater than their center thickness. High aspect ratio parts such as these were easy to handle and to mount in a variety of subassemblies.

However, the emergence of fiber optic telecommunications, as well as the micro lens market, has created a need for lenses with very low aspect ratios. The ability to control the outside diameter and runout is especially useful when the shape of the lens is cylindrical (with an aspect ratio <1) or, when the diameter of the lens is less than about 2 mm. It is particularly difficult to precisely grind the outside diameter of a lens with a diameter of less than about 2 mm. These small cylindrically shaped lenses are particularly useful as collimator lenses of the type used in fiber optic transmission. Lenses of this geometry cannot easily be made from spherical preforms, and so another low cost method of preform manufacture is required for these lenses to be made economically. The shape that most closely resembles the final lens is that of a right, circular cylinder with spherical ends which, in turn, minimizes glass flow.

SUMMARY OF THE INVENTION

It is therefore an object of the present invention to provide a method and an apparatus for forming cylindrical glass preforms with convex optical quality ends or end surfaces for later use in molding glass optical elements therefrom.

It is a further object of the present invention to provide a method and an apparatus for forming cylindrical glass preforms from generally spherical or ball glass preforms.

Briefly stated, the foregoing and numerous other features, objects and advantages of the present invention will become readily apparent upon a review of the detailed description, claims and drawings set forth herein. These features, objects and advantages are accomplished by rolling a generally spherical glass or ball preform of a suitable volume that has been heated to yield a viscosity of between $10^4$ and $10^8$ poise between substantially parallel platens. The generally spherical glass preforms can be economically produced with very accurate volume control by traditional grinding and polishing methods, or by any other of the numerous and well established methods of glass ball formation. See, for example, U.S. Pat. No. 5,709,723 to Gearing et al. Therefore, the final preforms produced from these balls will also have precise glass volume control. In the practice of the present invention, a generally spherical or ball preform is placed in a heated venturi. A flow of nitrogen gas suspends the glass preform so that it does not contact the sides of the venturi, since the highly polished optical quality surface of the preform may be negatively affected by contact with the surfaces of the venturi. Once the glass ball preform is heated to achieve the required viscosity ($10^4$–$10^8$ poise) for rolling, the nitrogen gas flow is interrupted, allowing the glass ball preform to drop onto a lower platen that is pre-heated to a level near that of the glass transition temperature. The temperature of the platen should be maintained to a level within approximately 30° C. above the glass transition temperature ($T_g$). This value will vary depending on the viscosity characteristics of the glass. A "short" glass will require closer monitoring, while a "long" glass will be easier to control. Once the glass ball preform is on the lower platen of the rolling chamber, the lower platen (which may or may not be moving horizontally when the glass ball preform is dropped thereon) is indexed horizontally to an initial rolling horizontal position. Once in the initial rolling position, the lower platen is indexed to an initial rolling vertical position (setting a predetermined gap between the upper platen and the lower platen) where the preform is engaged by the preferably stationary upper platen. From this position, the lower platen is moved horizontally which causes the glass ball preform to roll relative to the upper platen. As the lower platen is moved horizontally it is also gradually raised to thereby narrow the gap between the upper and lower platen. In this manner, as the glass preform is rolled between the upper platen and the lower platen, it is gradually subjected to a compressing force. The rolling action, in combination with the compressing force, causes the glass ball preform to be reshaped into a cylindrical body with convex ends. Once a predetermined final diameter for the cylindrical preform has been achieved, the vertical movement of the lower platen is halted. In other words, the upward movement of the lower platen stops when a predetermined final gap between the upper platen and the lower platen is reached. It is this predetermined final gap that determines the final diameter for the cylindrical preform. Once the final cylindrical diameter of the cylindrical preform is achieved, preferably, as the cylindrical glass preform traverses the lower platen, it is exposed to a decreasing temperature gradient that serves to raise the viscosity of the preform to a stage above its $T_g$ value. The result is a cylindrical glass preform having convex ends. The surfaces of the convex ends will not have been contacted by the platens and, as such, the surfaces of the convex ends will retain their optical quality. Such convex ends should be generally spherical, but may be aspherical, as a result of the actual shape of the glass ball preform used, or as a result of some minor deformation during the rolling process. However, in either case, the convex ends will be convex and substantially symmetrical. The cylindrical preform is then removed from the lower platen. Preferably, removal is accomplished by continuing to move the platen until the finished cylindrical preform with convex ends or end surfaces is automatically rolled off the end of the lower platen and into a receiving container. The platens then return to their home positions in preparation to accept the next heated glass ball preform.

The platen surfaces are fabricated and/or coated with a ceramic or refractory material that resists glass wetting and is amenable to working hot glass (such as boron nitride, graphite, vitreous carbon, or any noble metal such as platinum or gold). Based on the temperatures and the tool materials, an inert gas purge may be required to prevent tool surface degradation.

In another version, the glass ball preforms may be hot gobbed directly onto the lower platen, thereby eliminating the need for a heated venturi.

Those skilled in the art will understand that although the glass ball preforms used in the present invention are described as being generally spherical, such glass ball preforms will rarely, if ever be truly spherical, particularly if formed by hot gobbing. Similarly, the cylindrical glass preforms formed with the method of the present invention, although described herein as having generally spherical ends or end surfaces, will rarely, if ever have truly spherical ends or end surfaces. Thus, the term "generally spherical" as used herein is intended to mean ball shaped or ball-like.

DETAILED DESCRIPTION OF THE INVENTION

Figure 1:
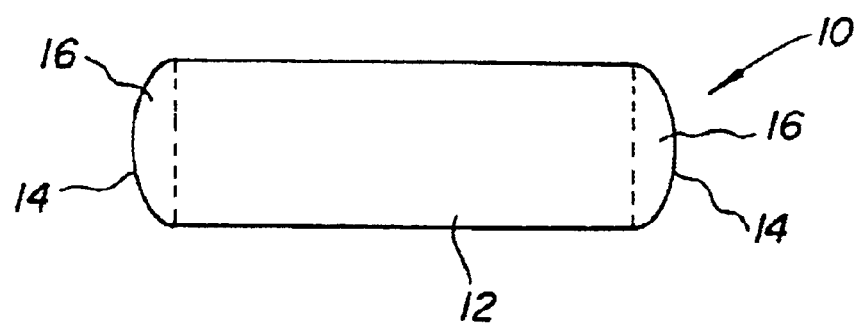
FIG. 1 is a side elevational view of a glass preform that is generally cylindrical with convex optical quality end surfaces as made with the method and apparatus of the present invention.

Turning first to FIG. 1, there is shown a glass preform 10 made according to the method of the present invention. Glass preform 10 comprises a cylindrical body 12 with convex ends 14 that may be described as being generally spherical. The convex ends 14 must include optical quality surfaces 16 with no cosmetic flaws. The surface of cylindrical body 12 does not need to be of optical quality since such surface does not perform any imaging functions.

Figure 2:
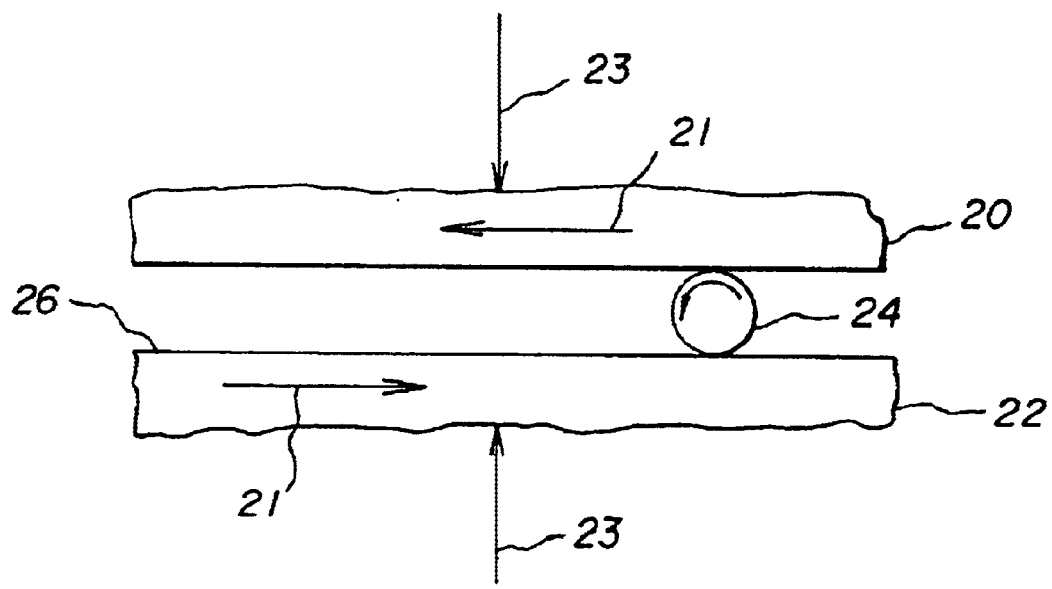
FIG. 2 is a schematic side elevational view depicting an apparatus for practicing the method of the present invention.

Looking next at FIG. 2, there is schematically depicted an apparatus for practicing the method of the present invention. The apparatus includes an upper platen 20 and a lower platen 22. A glass ball preform 24 (which may be described as being generally spherical) is placed on contact or rolling surface 26 of lower platen 22. Upper and lower platen 20, 22 are moved relative to one another. The relative movement of the upper and lower platen is in both the horizontal (as indicated by arrows 21) and vertical (as indicated by arrows 23) directions. The relative vertical movement between platens 20, 22 places the glass ball preform 24 in compression when contact or rolling surface 26 of upper platen 20 engages glass ball preform 24. The relative horizontal movement between platens 20, 22 causes the glass ball preform 24 to roll. The rolling movement in combination with the compression causes the glass ball preform 24 to deform to ultimately yield a glass preform 10 with a cylindrical body 12 with generally spherical ends 14 as depicted in FIG. 1. The relative vertical movement between platens 20, 22 may be effected by moving upper platen 20 downward or by moving lower platen 22 upward, or by moving both the upper platen 20 downward and the lower platen 22 upward. The relative horizontal movement between platens 20, 22 may be effected by moving upper platen 20 in a direction substantially parallel to the preform contact surfaces of platens 20, 22, or by moving lower platen 22 in a direction substantially parallel to the contact surfaces of platens 20, 22, or by moving both upper platen 20 and lower platen 22 in opposite directions, both substantially parallel to the contact surfaces of platens 20, 22.

In an effort to easily control the volume of the glass preform 10 (and therefore, the overall dimensions of the glass preform 10), the glass ball preform 24 is generated with strict volume control. This may be achieved by any of a number of well-established glass forming methods, such as hot gobbing, grinding and polishing, or molding.

Figure 3:
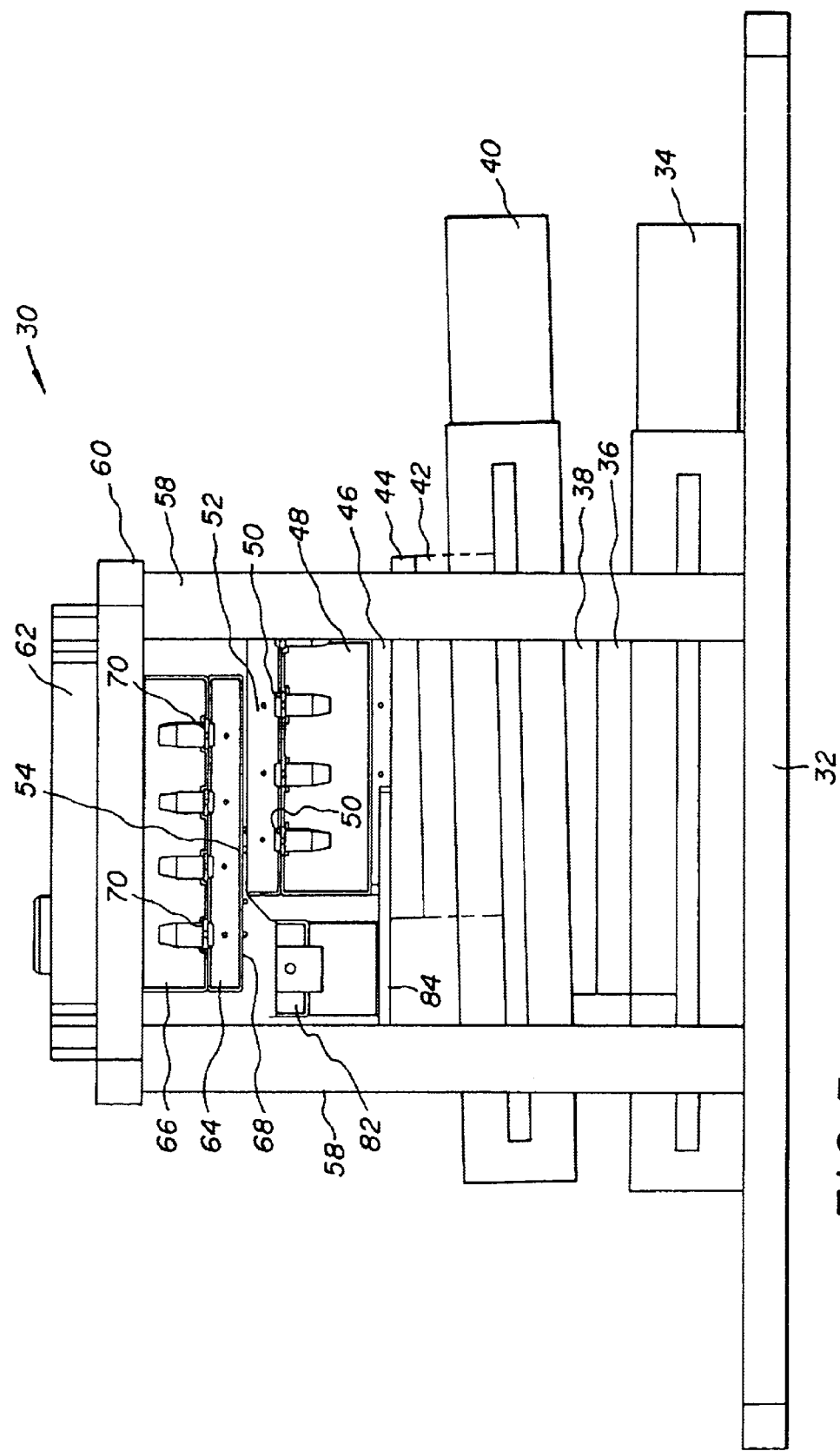
FIG. 3 is a front elevational view of a preferred embodiment apparatus of the present invention.
Figure 4:
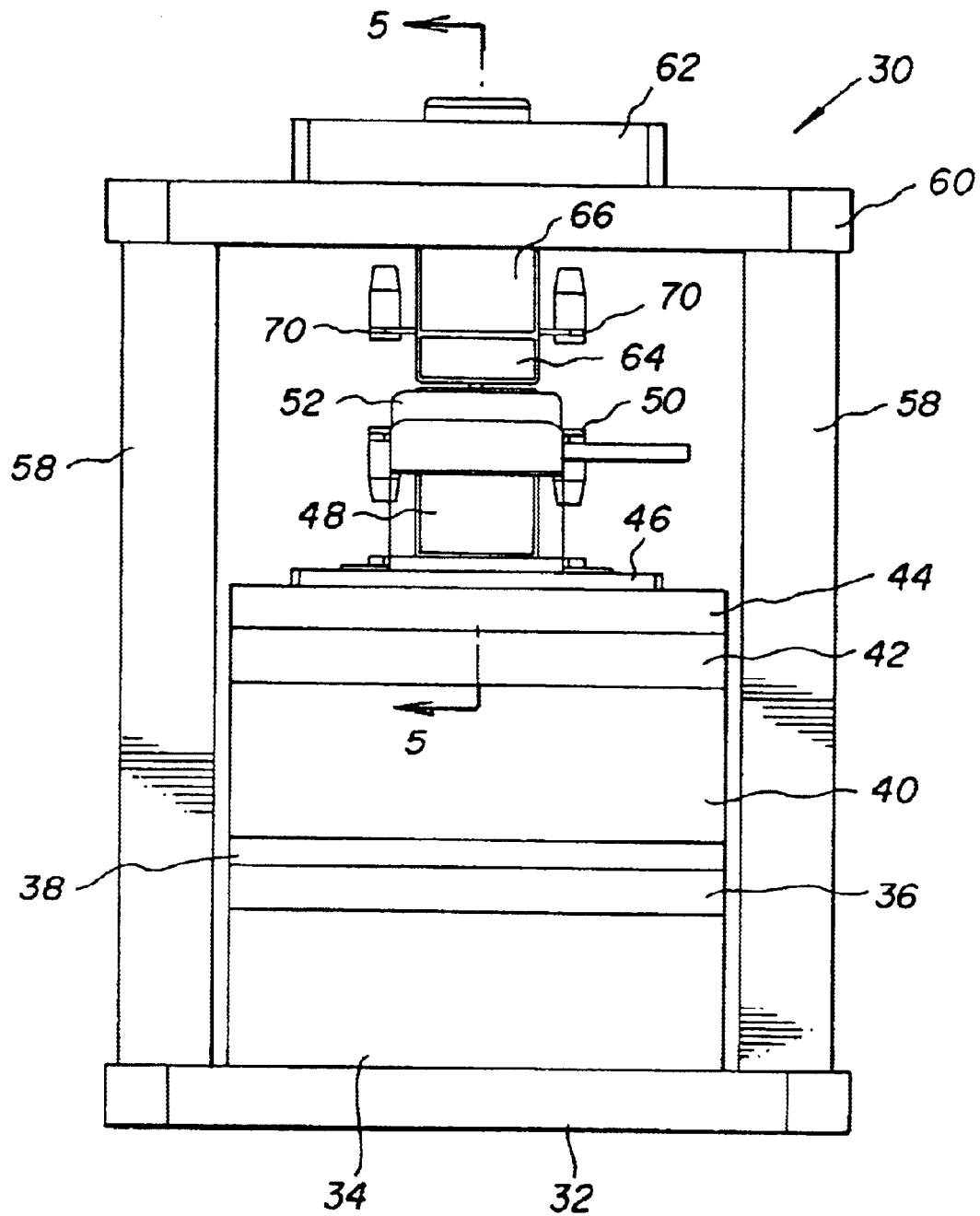
FIG. 4 is a side elevational view of a preferred embodiment apparatus shown in FIG. 3.
Figure 5:
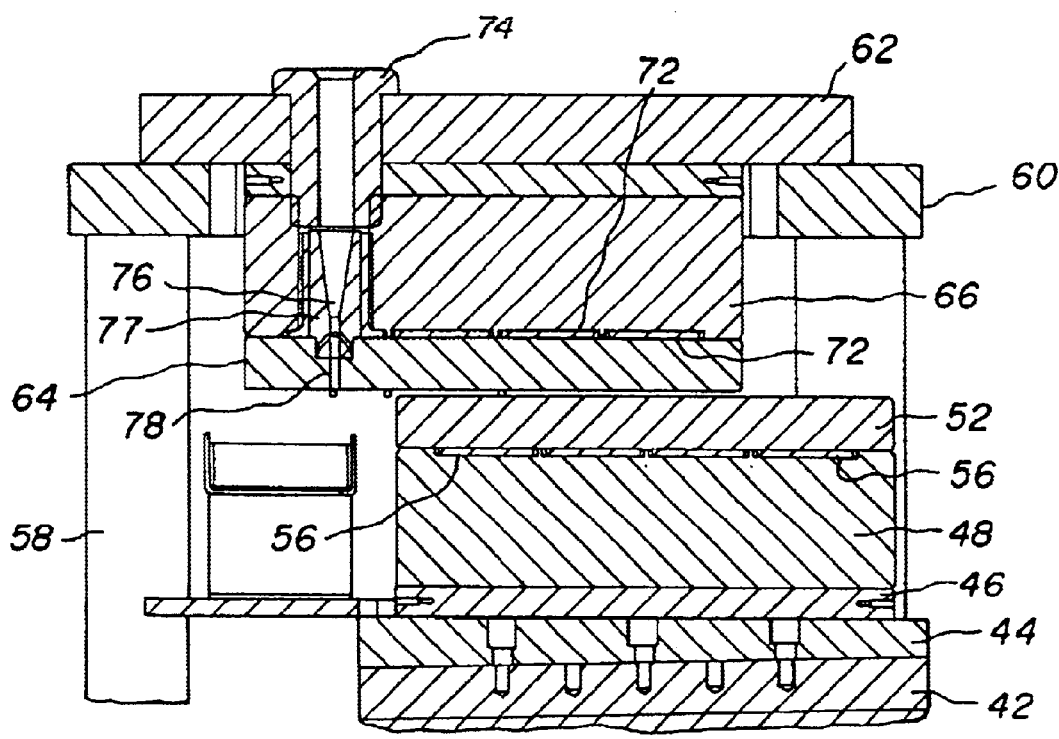
FIG. 5 is a cross sectional view taken along line 5—5 of FIG. 4.

Turning next to FIGS. 3 and 4, there are shown front and side elevational views of a preferred embodiment apparatus 30 of the present invention. Apparatus 30 includes a base plate 32 on which a first translation slide 34 is mounted. Affixed to translation slide 34 is slide carriage 36. Bolted to slide carriage 36 is first shim or wedge plate 38. Supported on first shim or wedge plate 38 is second translation slide 40. Note that because second translation slide 40 is supported on first shim or wedge plate 38, second translation slide 40 operates on a slight incline and the movement generated by second translation slide 40 includes both horizontal and vertical components. The first shim or wedge plate 38 preferably places the second translation slide 40 on an incline in the range of from about 1° to about 3°. This angle determines the magnitude of the tangential force that is used to form the final shape of the preform during operation. Affixed to second translation slide 40 is slide carriage 42. Bolted to slide carriage 42 is second shim or wedge plate 44. Second shim or wedge plate 44 provides a reverse incline that is equal and opposite to the incline of first shim or wedge plate 38. Thus, the top surface of second shim or wedge plate 44 resides in a substantially horizontal plane. Supported on second shim or wedge plate 44 is heater block mounting plate 46 on which is mounted heater block 48. Supported from heater block 48 are resistance heaters 50. Mounted to heater block 48 is lower platen 52 which includes preform rolling surface 54. Sandwiched between heater block 48 and lower platen 52 are the plate resistance heating elements 56 of resistance heaters 50 (see FIG. 5). It should be understood that because second translation slide 40 is supported and operated on an incline, movement effected by second translation slide 40 will include both horizontal and vertical components. In such manner, second translation slide 40 may also be considered a vertical translation slide. It is actually the vertical movement effected by the second translation slide 40 which is important in the operation of the present invention.

Extending upward from base plate 32 are support columns 58. Affixed to support columns 58 is top plate 60. Attached to the top of top plate 60 is venturi mounting plate 62. Supported from top plate 60 is upper platen 64 with heater block 66 mounted between top plate 60 and upper platen 64. Upper platen 64 includes preform rolling surface 68. Supported from heater block 66 are resistance heaters 70. Sandwiched between heater block 66 and upper platen 64 are the plate resistance heating elements 72 of resistance heaters 70 (see FIG. 5).

There is an insulating cup 74 extending through venturi mounting plate 62 with insulating cup 74 residing in alignment with venturi 76. There is a bore 78 through upper platen 64 which is in alignment with venturi 76.

The preform rolling surfaces 54, 68 of upper platen and the lower platen 52, 64 are preferably composed of a ceramic or refractory material that resists glass wetting and are amenable to working hot glass. Exemplary materials for this purpose include boron nitride, graphite, vitreous carbon, or any noble metal such as platinum or gold. Depending on the base material, the platens 52, 64 may need to be coated with an appropriate material that acts as a release agent between the base material and the hot glass. The platens 52, 64 are heated to a predetermined temperature that is equal to or greater than the glass transition temperature ($T_g$) of the glass ball preform 24 and controlled to within ±5° C., which is periodically confirmed by use of a remote temperature sensor (not shown).

Figure 6:
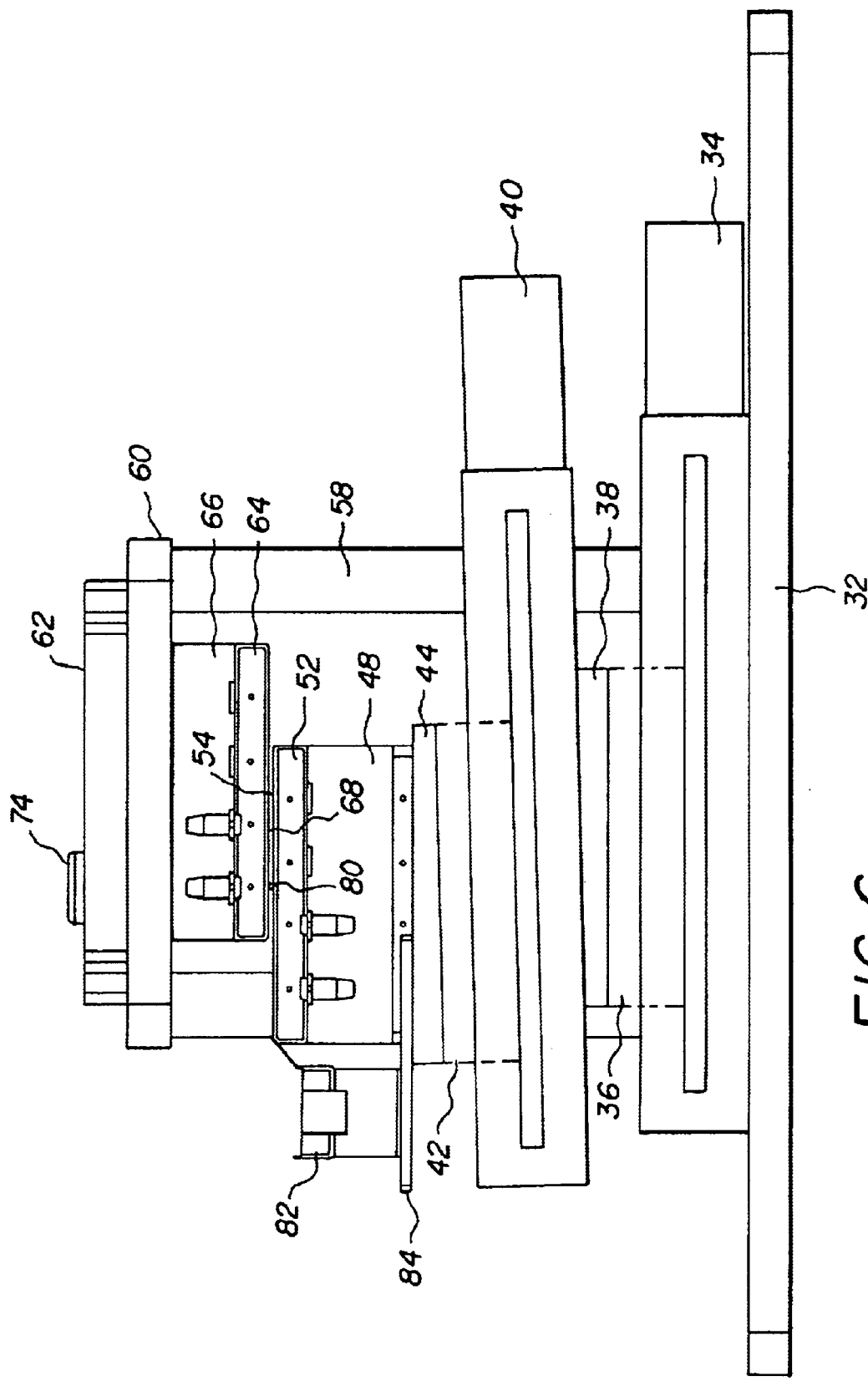
FIG. 6 is a side view schematic showing the relative positions of the upper platen and the lower platen when the lower platen is moved to receive a glass ball preform.

In the practice of the method of the present invention, the glass ball preform 80 is placed in venturi 76 through insulating cup 74. The glass ball preform 80 essentially hovers in venturi 76 supported by the flow of gas therethrough. While in the venturi 76 the glass ball preform 80 is heated by venturi heater 77 to at least the $T_g$ of the glass ball preform 80 but less than the melting temperature of the glass ball preform. When the glass ball preform 80 has attained the desired temperature it is allowed to drop through bore 78 in upper platen 64 to rest upon preform rolling surface 54 of the lower platen 52 (See FIG. 6). This is accomplished by reducing the flow of gas through venturi 76. The glass ball preform 80 is not yet in contact with the preform rolling surface 68 of the upper platen 64.

Figure 7:
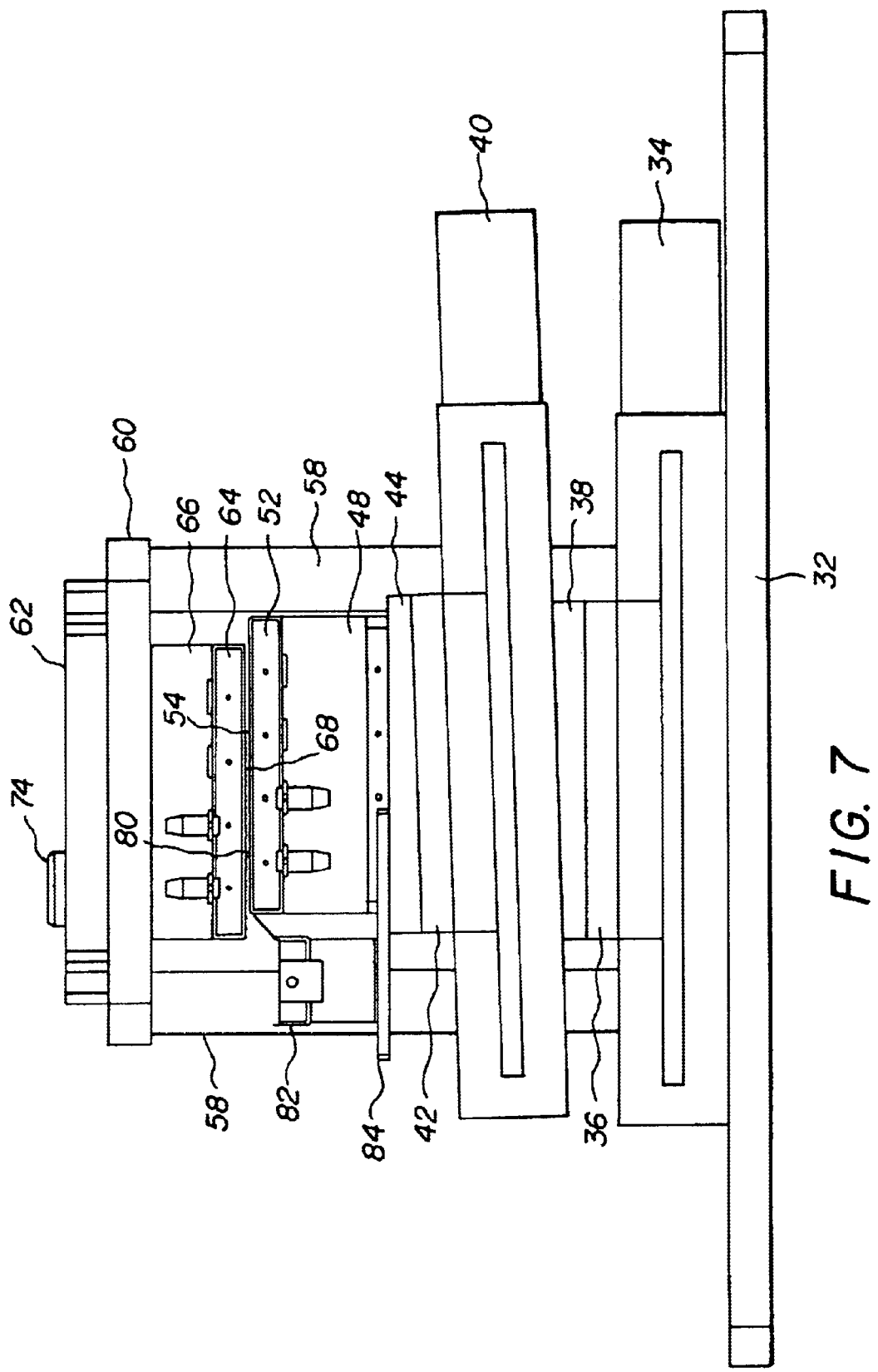
FIG. 7 is a side view schematic showing the relative positions of the upper platen and the lower platen when the lower platen is indexed to a position to begin the rolling of the glass ball preform between the upper platen and the lower platen.
Figure 8:
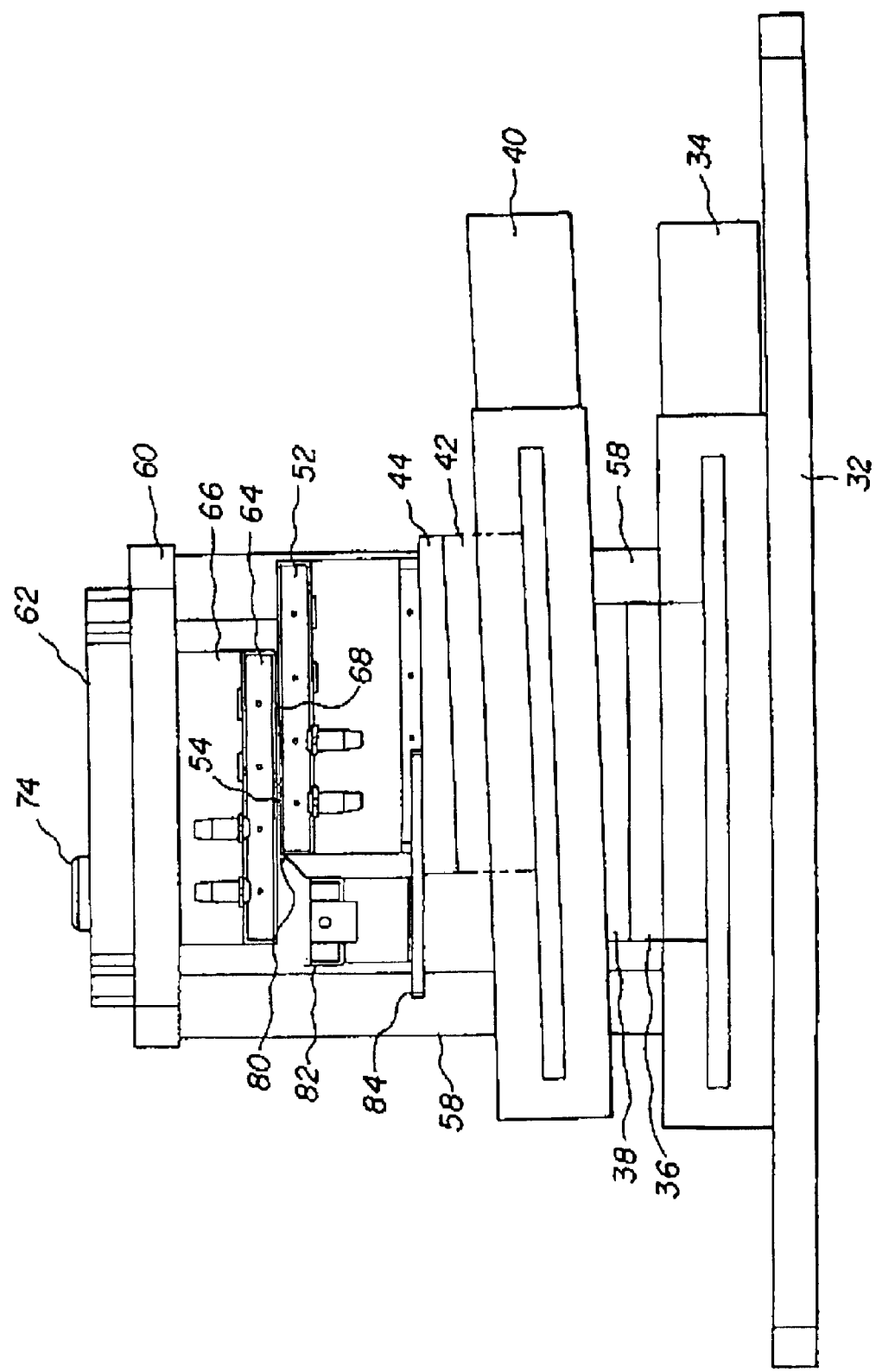
FIG. 8 is a side view schematic showing the relative positions of the upper platen and the lower platen when the lower platen has been moved to completion of a rolling cycle with the cylindrical preform formed thereby about to be dropped into the receiving tray.

The lower platen 52 is then indexed horizontally and vertically using second translation slide 40 until the glass ball preform 80 contacts the preform rolling surface 68 of the upper platen 64 (See FIG. 7). Continued translation causes the glass ball preform 80 to contact the preform rolling surface 68 of the upper platen 64 thereby imparting a compressive force on the glass ball preform 80. The compressive force exerted on the glass ball preform 80 is continued as the distance or gap between the rolling surfaces 54, 68 decreases. For this arrangement, the wedge plate 38 serves to orient second translation slide 40 at an angle of 1.5° from horizontal. In this manner, a reduction in the gap between the rolling surfaces 54, 68 of 0.62 mm is achieved with a translation slide stroke of approximately 23.6 mm. Wedge plate 44 incorporates a reverse angle as that of wedge plate 38 and, therefore, serves to orient lower platen 52 such that lower rolling surface 54 resides in a horizontal plane. Lower rolling surface 54 is therefore parallel to upper preform rolling surface 68. At the completion of the necessary forming stroke (see FIG. 8), a continuation of translation causes the finished part to be ejected into a tray for subsequent processing.

The upper platen 52 and lower platen 64 are each equipped with an array of heaters 50, 70 in order to expose the heated glass ball preform 80 to a decreasing temperature gradient. This feature is important to the forming process since the glass needs to be at a specific temperature for rolling, but must be at a lower temperature (below the $T_g$ for removal. This ensures that the formed glass is not further deformed during handling. The exact temperatures and amount of thermal gradient which should be generated in the platens are dependent on the specifics of the glass being formed. For the glass tested (Hoya TaC4), the rolling surface temperature was set to 705° C., and the temperature gradient between the heaters 50, 70 and thermocouples (positioned proximate to the upper and lower platen rolling surfaces) was 110° C. Assuming the glass ball preform 80 is at the rolling surface temperature, the glass should have had a viscosity of about $10^{7.4}$ poise. It should be understood that for the apparatus tested, the temperature monitor/control devices were placed within the platens, equidistant between the heaters and the rolling surface. This means that the exact temperature at the rolling surface was estimated based on the thermal characteristics of the platen material(s), and was not precisely known for this arrangement. Therefore, for the apparatus tested, the maximum temperature was electronically limited to 100° C. above the transition temperature of the glass as monitored by the thermocouples (not shown). Heat is maintained on the platens to prevent the glass ball preform 80 from being excessively chilled during the rolling process.

As mentioned above, a preheated glass ball preform is preferably dropped into a venturi 76, which serves to temporarily suspend the preform above the lower platen 52. A venturi heater 77 with a conical insert was used to maintain temperature of the glass ball preform 80, while the conical insert provided the flow characteristics necessary to adequately suspend the glass ball preform 80. An insulating cup 74 sits atop the heater 77 to retain heat and create an oven effect for the system. An inert gas such as nitrogen may be used to float the glass ball preform 80 in the venturi 76. Alternatively, a molten gob of glass may be directly dropped onto the lower platen 52 instead of the process just described, in which case the venturi heater 77 would not be required. The gas pressure is lowered to allow the hot glass ball preform 80 to gently descend onto the rolling surface 54 of the lower platen 52, thus avoiding any major deformation of the glass ball preform 80 before rolling. The first and second translation slides 34, 40 then actuate, causing relative motion between the upper and lower platens 52, 64.

Once the glass ball preform 80 contacts the rolling surface 68 of upper platen 64, the second horizontal translation slide 40 may be engaged to allow for adjustments in the force profile of the system. As noted above, both upper and lower platen 64, 52 are backed up by a heater block 48, 66, which is made of a refractory material able to withstand the high temperatures required. In an exemplary apparatus 30 used to practice the present invention, two resistance heaters were used in each heater block 48, 66, to provide the temperature gradient for the system. As more heaters are used, finer temperature gradient control may be achieved. The heater blocks 48, 66 are preferably supported by separate mounting plates 46, 60 due to the low yield strength typical of most refractory materials.

As the glass ball preform 80 is engaged by both the upper platen 64 and lower platen 52 with the lower platen 52 moving both horizontally and vertically, the glass ball preform 80 begins to roll and the shape of the glass ball preform 80 begins to change from generally spherical to generally cylindrical. At the end of the forming cycle, the second translation slide 40 holds position, and the final shape is achieved. In other words, the final diameter of the generally cylindrical preform is determined by a final predetermined gap between the upper and lower platen 64, 52. As the first translation slide 34 continues to move, the glass ball preform 80 rotates creating a rolling motion relative to the upper and lower platen 64, 52. As the stroke is completed, the glass ball preform 80 drops into tray 82, which is supported adjacent to the lower platen 52 by tray support 84. Tray support 84 is preferably affixed to wedge plate 44 or to lower platen 52. As the cycle is completed, the translation slides 34, 40 return to their original positions and the glass ball preform 80 in its final form may be removed. Since the heaters maintain temperature throughout the cycle, the system is ready to accept another glass ball preform as soon as they are returned to their home positions.

Until the final diameter of the generally cylindrical glass ball preform 80 is achieved, movement of the lower platen 52 is preferably driven through simultaneous actuation of both the first and second translation slides 34, 40. The rate of movement as effected by each translation slide 34, 40 can, of course, be adjusted such that the force profile as applied to the rolling glass ball preform 80 can be varied as desired. However, those skilled in the art will recognize that the desired motion of upper platen 64 can be controlled through actuation of second translation slide 40 alone. It should further be understood, however, that the first translation slide 34 allows for greater versatility in generating a desired force profile while rolling a glass ball preform 80.

Those skilled in the art will further recognize that first and second translation slides 34, 40 may be any of a variety of devices that provide precise linear motion. Such devices include, for example, for example, air bearings, hydrostatic bearings, and precision rolling element stages. It should further be appreciated that second translation slide 40 may be replaced with a drive mechanism that provides only vertical motion to lower platen 52. In such case, first translation slide 34 would be used to drive all horizontal movement of the lower platen 52. Such a drive mechanism for driving vertical motion only may be, for example, a motor driven screw jack, or a scissor-type vertical translation stage.

The following paragraphs delineate some equations that can be used to successfully predict the torques and forces required for shaping the glass preform at a specific glass viscosity. These values are then used to design the main components and provide a starting point for setting effective system and process parameters.

With regard to the forces necessary to form the heated glass, the glass itself is visco-elastic, which allows it to re-form under the application of external forces. The press out force is generated by the decrease in spacing between the platens, and is constant, so long as the relative velocity of the moving platens and the angle between the platens remains constant. The press out force must be greater than the viscous force needed for forming, and can be determined by use of the standard equation for viscosity. The equation $$F=(\eta(T)*A)*(dv/dr) \qquad \text{Equation 1}$$

relates the viscosity as a function of temperature $\eta(T)$, the velocity of motion v, the contact area A, and the separation distance r, to the applied force F. As the shape of the rolled glass changes, the contact area in the equation also changes. It is helpful to examine the initial conditions and the final conditions to see how the force requirements change due to this effect. For the example, using Hoya TaC4 glass as discussed above, the initial force was calculated to be 353 N, while the final force required was 512 N based on a constant platen speed of 1 cm/sec. The additional force is needed due to the increased surface area of the glass preform and the subsequent increase in frictional force that must be overcome. These equations also help determine the minimum speed at which the system will successfully operate.

The precise coefficient of friction for the glass type(s) tested against the roller plates is not known at the elevated temperatures used here, but may be roughly calculated from the equation $$\mu_k = F_k / F_N, \qquad \text{Equation 2}$$

where the frictional force $F_k$ is taken to be something greater than the tangential force generated through rolling. The rolling motion keeps the sphere from smearing on the platen. The frictional force must be greater than the tangential force, or else the object will skid on the platen at high viscosity levels, and smear on the platen at low viscosity levels. Another way of expressing that is to say that the coefficient of friction between the two surfaces ($\mu_k$) must be greater than the tangent of the angle $\theta$ between the moving plates. This will determine the minimum allowable angle at which the system will successfully operate.

Since the force causes a rotation in the glass part, a torque is also generated and is given by the vector cross product $$\tau = R \times F = R*F*\sin\theta, \qquad \text{Equation 3}$$

where $\theta$ is the angle formed between the vectors R and F. Since the press out force is exerted through the axis and at 180° to the radius vector R, it provides no contribution to the torque. It is the tangential force that contributes to the torque, which is governed by the angle between the platens. This can now be written as $$\tau = R \times F = R*F_t*\sin\theta = R*F_t, \qquad \text{Equation 4}$$

since $\theta = 90°$. Therefore, as the normal force causes a flattening of the sphere, the tangential force causes an extension of the sphere in a direction perpendicular to its translational movement.

The kinetic energy of a rolling object can be given by $$K_{tot} = (½)(I_{cm}*\omega^2) + (½)(M*v^2), \qquad \text{Equation 5}$$

where $I_{cm}$=Moment of inertia about the center of mass
$\omega$=Angular velocity about the axis of rotation
M=Mass of the object
v=Linear velocity of the object In the case of a sphere having a radius of r, the equation may be written as $$K_{tot} = (v^2/2)((I_{cm}/r^2) + M) \qquad \text{Equation 6}$$

The moment of inertia of the sphere is given by $$I_{cm} = (⅖)(M*r_s^2) \qquad \text{Equation 7}$$

where the quantity $r_s$ is the radius of the sphere. As the part is rolled out, the radius changes from being spherical ($r_s$) to cylindrical ($R_c$), and the moment of inertia changes from $I=(⅖)(M*r_s^2)$ to $I=(9/10)(M*R_c^2)$ for a cylinder with spherical ends. Since the total energy of the system remains constant, and surface tension causes the surface area to be minimized, a cylinder is formed having generally spherical ends according to the relation $r_s=1.3416(R_c)$. The volume of the initial sphere will determine the final length of the cylinder. Thus, for example, an initial spherical diameter of 2.405 mm will produce a final cylindrical diameter of 1.793 mm with nearly spherical ends. Of course, since other shapes may be formed so that this relation does not hold, these equations are only accurate for the design of a right circular cylinder with generally spherical ends.

In an alternate embodiment, the present invention could be practiced such that the first translation slide may be replaced with a rotary slide so that the spherical glass preform is rolled out in a circular pattern. The second or vertical translation slide and all other components described above would remain essentially in tact. Under such an arrangement, the glass ball preform would form a right circular cylinder with generally spherical ends, but its growth would be entirely toward the center of rotation. Any object that undergoes circular movement will experience a centripetal acceleration directed towards the center of rotation. The direction of this acceleration is indicative of a centripetal force. The force is given by the equation $F=mv^2/R$, where m is the mass of the glass, v is the velocity of rotation, and R is the distance from the center of the object to the center of rotation. In this instance, the forming force is directly proportional to the square of the velocity, which may simplify the design. This force will lengthen the sphere in the same manner as the previously described tangential force does to form a right circular cylinder.

Figure 9:
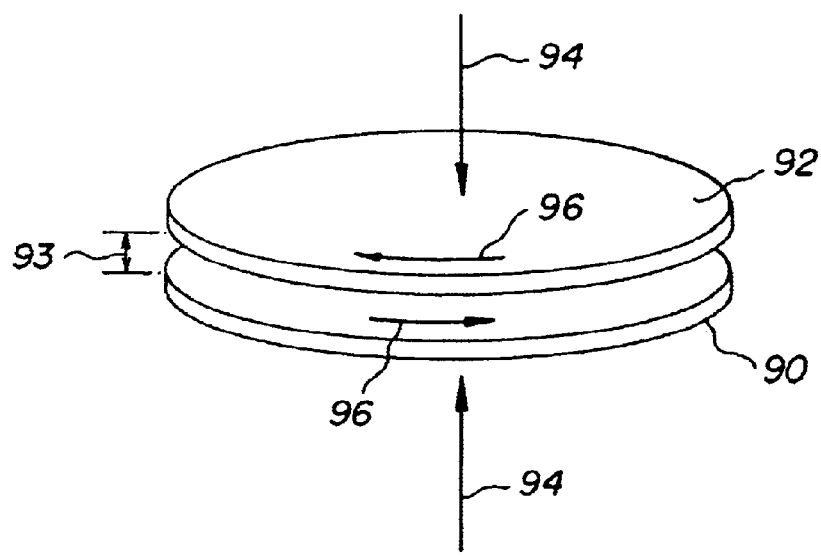
FIG. 9 is a perspective schematic of an alternate embodiment apparatus of the present invention wherein rolling of a glass ball preform is accomplished through rotational movement of at least one of the upper platen and the lower platen.

This embodiment is schematically depicted in FIG. 9. A glass ball preform 80 would be placed between a lower platen 90 and an upper platen 92. Either or both lower platen 90 and upper platen 92 would be moved vertically to cause the gap 93 therebetween to narrow (as indicated by arrows 94). Further, at least one of lower platen 90 and upper platen 92 would be rotationally driven (as indicated by arrows 96) to cause the glass ball preform to roll therebetween to thereby form a generally cylindrical preform with convex ends.

In yet another alternate embodiment, another horizontal translation slide may be added to the apparatus depicted in FIGS. 3 and 4 and mounted orthogonal to the existing slide 34. Using this arrangement, a circular rotation could be approximated to a close degree and the glass ball preform will form a cylinder as described above.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

Parts List

| | |
|---|---|
| 10 | glass preform |
| 12 | cylindrical body |
| 14 | convex ends |
| 16 | optical quality surfaces |
| 20 | upper platen |
| 21 | horizontal direction |
| 22 | lower platen |
| 23 | vertical direction |
| 24 | glass ball preform |
| 26 | contact or rolling surface |
| 30 | apparatus |
| 32 | base plate |
| 34 | first translation slide |
| 36 | slide carriage |
| 38 | first shim or wedge plate |
| 40 | second translation slide |
| 42 | slide carriage |
| 44 | second shim or wedge plate |
| 46 | heater block mounting plate |
| 48 | heater block |
| 50 | resistance heaters |
| 52 | lower platen |
| 54 | preform rolling surface |
| 56 | plate resistance heating elements |
| 58 | support columns |
| 60 | top mount plate |
| 62 | venturi mounting plate |
| 64 | upper platen |
| 66 | heater block |
| 68 | preform rolling surface |
| 70 | resistance heaters |
| 72 | plate resistance heating elements |
| 74 | insulating cup |
| 76 | venturi |
| 77 | venturi heater |
| 78 | bore |
| 80 | glass ball preform |
| 82 | tray |
| 84 | tray support |
| 90 | lower platen |
| 92 | upper platen |
| 93 | gap |
| 94 | arrows showing gap 93 narrowing |
| 96 | platens rotationally driven |

What is claimed is:

1. A method for making cylindrical glass preforms with convex, optical quality end surfaces comprising the steps of:
   (a) placing a glass ball preform having an optical quality surface between an upper and a lower platen;
   (b) raising the temperature of the glass ball preform to a temperature above the glass transition temperature of the glass ball preform; and
   (c) simultaneously rolling and compressing the glass ball preform between the upper platen and the lower platen by imparting relative motion to the upper and lower platens until a predetermined gap between the upper and lower platen is achieved.

2. A method for making cylindrical glass preforms with convex, optical quality end surfaces comprising the steps of:
   (a) placing a glass ball preform having an optical quality surface on a heated lower platen;
   (b) raising the temperature of the glass ball preform to a temperature above the glass transition temperature of the glass ball preform;
   (c) engaging the glass ball preform with an upper platen; and
   (d) moving at least one of the upper and lower platen to cause a gap between the upper and lower platen to narrow to a predetermined dimension and simultaneously to cause the glass ball preform to roll between the upper and lower platen to form a cylindrical preform having a predetermined diameter, the cylindrical preform having convex, optical quality end surfaces.

3. A method for making cylindrical glass preforms with convex, optical quality end surfaces comprising the steps of:
   (a) placing a glass ball preform having an optical quality surface on a heated lower platen;
   (b) lowering the viscosity of the glass ball preform to be in a range of from about $10^4$ to about $10^8$ poise;
   (c) engaging the glass ball preform with an upper platen;
   (d) effecting relative lateral movement between the upper platen and the lower platen;
   (e) effecting relative vertical movement between the upper platen and the lower platen to cause a gap between the upper platen and the lower platen to narrow to a predetermined dimension; and
   (f) rolling the glass ball preform between the upper and lower platen to form a cylindrical preform having a predetermined diameter, the cylindrical preform having convex, optical quality end surfaces.

4. A method for making cylindrical glass preforms with convex, optical quality end surfaces comprising the steps of:
   (a) placing a glass ball preform having an optical quality surface on a heated lower platen;
   (b) raising the temperature of the glass ball preform to a temperature above the glass transition temperature of the glass ball preform;
   (c) engaging the glass ball preform with an upper platen;
   (d) effecting relative lateral movement between the upper platen and the lower platen;
   (e) effecting relative vertical movement between the upper platen and the lower platen to cause a gap between the upper platen and the lower platen to narrow to a predetermined dimension; and
   (f) rolling the glass ball preform between the upper platen and the lower platen to form a cylindrical preform having a predetermined diameter, the cylindrical preform having convex, optical quality end surfaces.

5. A method as recited in claim 2 further comprising the step of:
   lowering the temperature of the cylindrical preform to below the glass transition temperature thereof;
   removing the cylindrical preform from the lower platen.

6. A method as recited in claim 2 wherein:
   the step of raising the temperature of the glass ball preform is performed by placing the glass ball preform in a heated venturi.

7. A method as recited in claim 6 further comprising the step of:
   operating the venturi with an inert gas.

8. A method as recited in claim 2 wherein:
   the upper platen is generally parallel to the lower platen.

9. A method as recited in claim 2 wherein:
   said moving step is performed by rotating at least one of the upper platen and the lower platen while simultaneously narrowing the gap between the upper platen and the lower platen.

10. A method as recited in claim 5 wherein:

the step of lowering the temperature of the cylindrical preform is performed by effecting a temperature gradient across a portion of the lower platen after the predetermined diameter has been achieved such that the temperature of the cylindrical preform is lowered to the glass transition temperature thereof prior to the removing step.

11. An apparatus for making cylindrical glass ball preforms with convex, optical quality end surfaces comprising the steps of:

(a) a lower platen on which a glass ball preform having an optical quality surface is placed;

(b) an upper platen which is generally parallel to the lower platen, the upper and/or lower platen being movable relative to one another in a vertical direction and a horizontal direction;

(c) means for heating the glass ball preform to above a glass transition temperature thereof; and (d) means for setting a final gap between the upper platen and the lower platen, the final gap controlling the diameter of the cylindrical glass ball performs, relative vertical movement between the upper and lower platen allowing the glass ball preform to be engaged between respective rolling surfaces of the upper platen and the lower platen, relative horizontal movement between the upper platen and the lower platen causing the glass ball preform to roll between the respective rolling surfaces of the upper platen and the lower platen.

12. An apparatus as recited in claim 11 wherein:

the means for heating the glass ball preform is a heated venturi.

13. An apparatus as recited in claim 11 further comprising:

heaters for raising the temperature of the upper platen to predetermined levels.

14. An apparatus as recited in claim 11 further comprising:

heaters for generating a lateral temperature gradient across the upper platen and the lower platen.

15. An apparatus as recited in claim 12 wherein:

the venturi is operated with an inert gas.

16. An apparatus as recited in claim 11 wherein:

relative horizontal movement between the upper platen and the lower platen is performed by rotating at least one of the upper platen and the lower platen and relative vertical movement between the upper platen and the lower platen is performed to narrow the gap between the upper platen and the lower platen.

17. A method as recited in claim 1 wherein:

the upper platen is generally parallel to the lower platen.

18. A method as recited in claim 1 wherein:

said rolling and compressing steps are performed by rotating at least one of the upper platen and the lower platen while simultaneously narrowing the gap between the upper platen and the lower platen.

* * * * *

UNITED STATES PATENT AND TRADEMARK OFFICE
CERTIFICATE OF CORRECTION

PATENT NO.     : 6,761,046 B2
DATED          : July 13, 2004
INVENTOR(S)    : Jayson J. Nelson et al.

It is certified that error appears in the above-identified patent and that said Letters Patent is hereby corrected as shown below:

Column 13,
Line 23, delete "performs" and insert -- preforms --.

Signed and Sealed this

Thirty-first Day of May, 2005

JON W. DUDAS
*Director of the United States Patent and Trademark Office*